US012803836B2

(12) United States Patent
Zhou

(10) Patent No.: US 12,803,836 B2
(45) **Date of Patent: *Nov. 17, 2026**

(54) CABLE MODEM UPSTREAM BANDWIDTH ALLOCATION

(71) Applicant: Charter Communications Operating, LLC, St. Louis, MO (US)

(72) Inventor: Lei Zhou, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/272,070

(22) Filed: Jul. 17, 2025

(65) Prior Publication Data

US 2025/0343706 A1 Nov. 6, 2025

Related U.S. Application Data

(63) Continuation of application No. 18/428,174, filed on Jan. 31, 2024, now Pat. No. 12,388,672.

(51) Int. Cl.
*H04L 12/28* (2006.01)
*H04J 3/16* (2006.01)

(52) U.S. Cl.
CPC ........ *H04L 12/2801* (2013.01); *H04J 3/1694* (2013.01)

(58) Field of Classification Search
CPC .... H04L 12/2801; H04L 47/24; H04J 3/1694; H04N 21/26216; H04N 21/2408; H04N 21/437; H04N 21/6168
See application file for complete search history.

(56) References Cited

U.S. PATENT DOCUMENTS 12,388,672 B1 8/2025 Zhou
2002/0159513 A1* 10/2002 Williams ............ H04L 12/5602 375/257
2004/0258094 A1* 12/2004 Bashan ............... H04L 12/5601 370/431
2016/0197846 A1 7/2016 Bernstein
2022/0078806 A1* 3/2022 Sevindik ............... H04W 28/16
2022/0086544 A1* 3/2022 Zhang ................ H04Q 11/0067
2024/0236532 A1* 7/2024 Liu ......................... H04L 12/12
2025/0247266 A1 7/2025 Zhou

* cited by examiner

*Primary Examiner* — Gigi L Dubasky
(74) *Attorney, Agent, or Firm* — Mendelsohn Dunleavy, P.C.; Steve Mendelsohn

(57) ABSTRACT

In a cable modem network, upstream bandwidth is allocated to service flows by receiving requests from modems, wherein each request identifies an amount of requested bandwidth for a corresponding requesting service flow; determining how much best-effort bandwidth to allocate for each requesting service flow; determining how much remaining bandwidth is available after taking into account all of the best-effort bandwidth for the requesting service flows; determining how much of the remaining bandwidth to allocate as proactive grant service (PGS) upstream bandwidth to PGS service flows; determining, for each requesting service flow, a summed bandwidth as a sum of any corresponding best-effort bandwidth and any corresponding PGS bandwidth; determining, for each requesting service flow, an amount of allocated bandwidth as a minimum of the summed bandwidth and a maximum allowable bandwidth; and transmitting grants to the modems identifying the amounts of allocated upstream bandwidth for the corresponding service flows.

20 Claims, 4 Drawing Sheets

100

200

CABLE MODEM UPSTREAM BANDWIDTH ALLOCATION

This is a continuation of co-pending application Ser. No. 18/428,174, filed on Jan. 31, 2024, the teachings of which are incorporated herein by reference in their entirety.

BACKGROUND

Field of the Disclosure

The present disclosure relates to communication networks and, more specifically but not exclusively, to cable modem communication networks.

Description of the Related Art

This section introduces aspects that may help facilitate a better understanding of the disclosure. Accordingly, the statements of this section are to be read in this light and are not to be understood as admissions about what is prior art or what is not prior art.

In a conventional time-division duplex (TDD) cable modem communication network, such as a Data Over Cable Service Interface Specification (DOCSIS) network, a number of modems share the finite transmission bandwidth on a common cable, where each modem supports one or more different service flows potentially having different bandwidth requirements. A cable modem termination system (CMTS) is responsible for allocating downstream bandwidth (B/W) and upstream B/W for the different service flows. As used herein, the term “CMTS” includes integrated CMTS systems and distributed access architecture (DAA)-based CMTS systems such as virtual CMTS systems and remote physical (PHY) or medium access control (MAC) managers and remote MAC-PHYs. There are a number of conventional techniques for allocating upstream B/W to the modems for their service flows.

In a conventional best-effort (BE) technique, for each service flow for which a modem has data to transmit over the cable in the upstream direction, the modem transmits, to the CMTS, a request for upstream B/W identifying the service flow, the modem, and how much bandwidth is requested by the modem for the service flow. The CMTS collects the requests from those modems for those service flows and decides how much upstream B/W to allocate for each of those service flows based on a number of different factors, including the type of service flow, where different types of service flows require different levels of B/W and response times for proper operation. In response to each upstream B/W request, the CMTS transmits, to the corresponding modem, a grant response identifying the initial timeslot and the number of timeslots available to be used by the modem for the corresponding service flow. One of the drawbacks of such BE techniques is the latency resulting from the one-to-one relationship between upstream B/W requests from the modems and grant responses from the CMTS.

Another conventional technique for allocating upstream B/W is referred to as proactive grant services (PGS). In a PGS technique, for a service flow that a modem has data to transmit over the cable in the upstream direction, the modem transmits, to the CMTS, an initial request for upstream B/W identifying the service flow, the modem, and how much bandwidth is requested by the modem for the service flow. The CMTS decides how much upstream B/W to allocate for that service flow based on a number of different factors, including the type of service flow. In response to that initial upstream B/W request, the CMTS transmits, to the corresponding modem, an initial grant response identifying the initial timeslot and the number of timeslots available to be used by the modem for that service flow.

Following this initial exchange of upstream B/W request and grant response, the CMTS then continues to proactively transmit periodic grants allocating upstream B/W to that modem for that service flow without requiring the modem to transmit additional upstream B/W requests. If, over time, the CMTS determines that the service flow is no longer using the allocated upstream B/W, then the CMTS will stop sending proactive grants to that modem for that service flow. If and when that modem subsequently has additional data to transmit for that service flow, then the modem will re-initiate the procedure by transmitting another initial upstream B/W request for that service flow to the CMTS.

A conventional PGS technique can reduce the latency involved in allocating upstream B/W as compared to a conventional BE technique by reducing the number of requests transmitted by the modems. Unfortunately, conventional PGS techniques suffer from inefficient bandwidth allocation when service flows stop using all or even any of the proactively allocated upstream B/W.

SUMMARY

Problems in the prior art are addressed in accordance with the principles of the present disclosure by a new technique for allocating upstream B/W for service flows in a cable modem communication network that addresses both the latency issues of conventional BE techniques and the inefficient bandwidth allocation of conventional PGS techniques.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms “a,” “an,” and “the,” are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
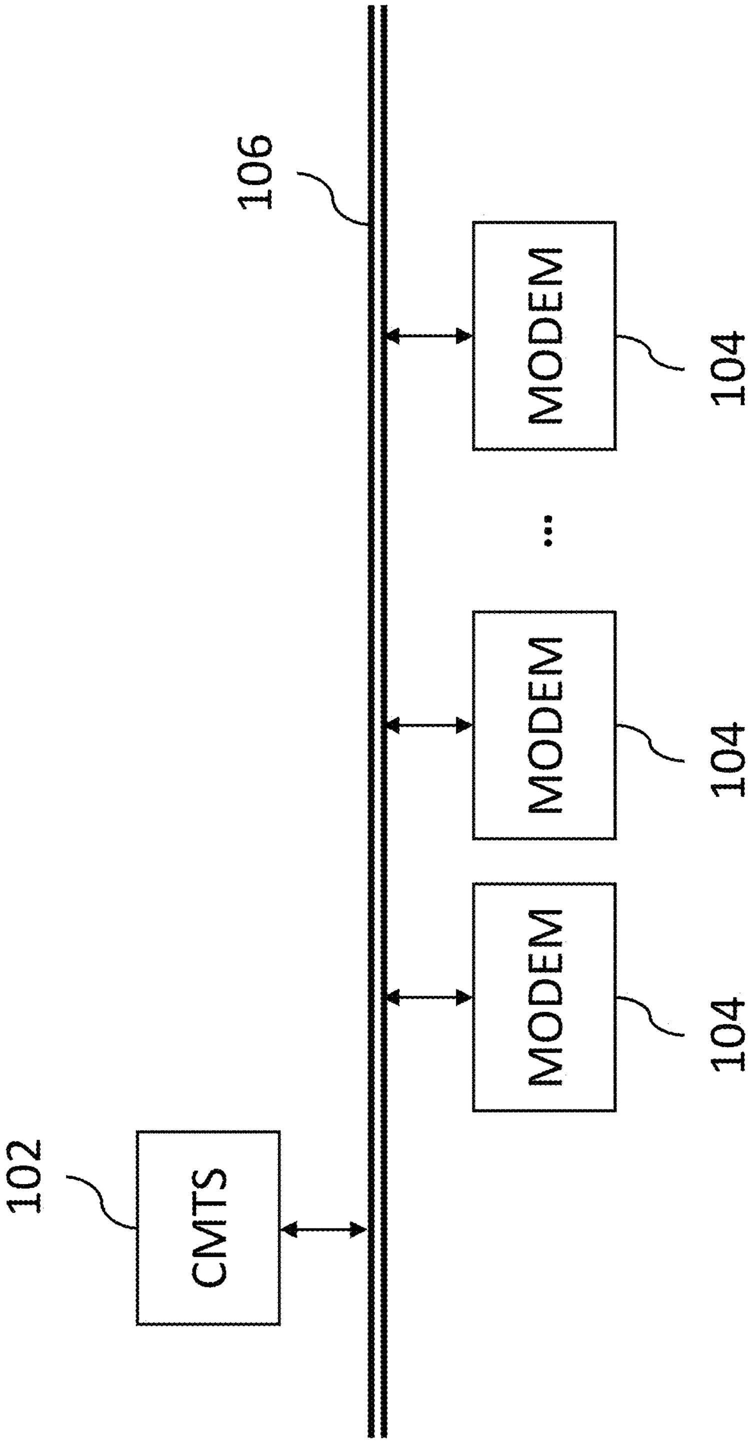
FIG. 1 is a simplified block diagram of a cable modem communication network of the present disclosure.

FIG. 1 is a simplified block diagram of a cable modem communication network 100 of the present disclosure. As shown in FIG. 1, network 100 has a CMTS 102 and a number of modems 104 that communicate via a common cable 106, where each modem 104 supports one or more different service flows (not shown in FIG. 1). According to certain embodiments of the disclosure, each service flow may independently subscribe to receive PGS service. As such, at any given time, one or more service flows in the network 100 may be PGS service flows and one or more service flows may be non-PGS service flows.

When a modem 104 has data to transmit for one of its service flows, the modem 104 transmits an upstream B/W request to the CMTS 102 explicitly identifying a requested amount of upstream B/W. During an operation cycle of the network 100, the CMTS 102 collects the upstream B/W requests from requesting modems 104 and determines how much upstream B/W to allocate for each corresponding service flow. If and when the total amount of allocated upstream B/W is less than a specified maximum total allowable amount of allocated upstream B/W for the cable 106 during a network operation cycle, the CMTS 102 is able to divvy up the remaining, unallocated upstream B/W to PGS service flows, if any, including possibly to PGS service flows for which an upstream B/W request was not transmitted during the previous network operation cycle.

Figure 2:
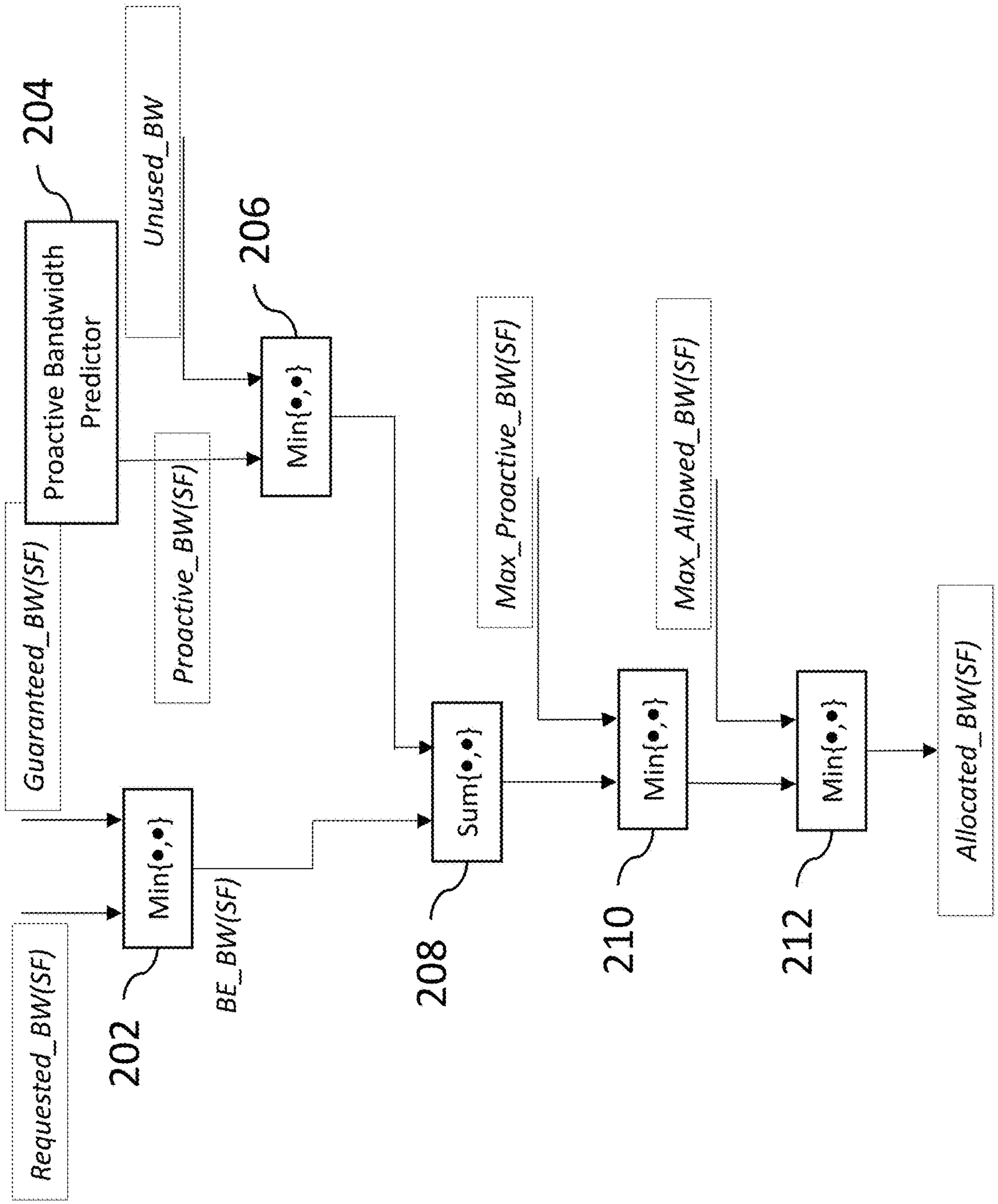
FIG. 2 is a representation of the scheduler processing performed by the CMTS of FIG. 1 to allocate upstream B/W to a modem for one of the modem's service flows.

FIG. 2 is a representation of the scheduler processing 200 performed by the CMTS 102 to allocate upstream B/W to a modem 104 for one of the modem's service flows. In FIG. 2:

Requested_BW (SF) is the amount of upstream B/W requested by the modem 104 for the service flow (SF) in the initial upstream B/W request. For a queue-depth-based requesting mechanism, Requested_BW (SF) is equal to the remaining volume of data in the modem's buffer for the service flow. Requested_BW (SF) can be zero if the service flow does not request any upstream B/W.

Guaranteed_BW (SF) is the amount of upstream B/W allowed to the service flow by an algorithm, such as a token-bucket algorithm, performed by the CMTS 102 for the service flow. In some implementations, the CMTS 102 independently performs the token-bucket algorithm for each different service flow.

BE_BW (SF) is the amount of upstream B/W allocated to the service flow based on the best-effort rule.

Proactive_BW (SF) is the amount of upstream B/W awarded to the service flow proactively by the CMTS 102, if the service flow is a PGS service flow, as determined by the Proactive Bandwidth Predictor (PBP) 204 implemented by the CMTS 102, which predicts the immediate need for bandwidth by the PGS service flow based on activity detections and traffic pattern analyses as well as the queue status of that service flow interference from Requested_BW (SF). If the service flow is not a PGS service flow, then the value of Proactive_BW (SF) will be zero.

Unused_BW is the unused amount of upstream BW after the BE_BW (SF) of all the service flows are subtracted from the total amount of upstream B/W.

Max_Proactive_BW (SF) is the specified upper limit for the amount of upstream B/W that can be proactively allocated to the service flow as determined by a specified channel utilization of the system and the priority of the service flow.

Max_Allowed_BW (SF) is the specified upper limit for the amount of upstream B/W that can be allocated to the service flow as determined by the maximum sustainable rate and the maximum peak rate of the quality of service (QOS) configurations for the service flow. Max_Allowed_BW (SF) may be different for different service flows.

Allocated_BW (SF) is the amount of upstream B/W allocated to the service flow by the CMTS 102.

Referring to FIG. 2, in Step 1, minimum (Min) block 202 receives Requested_BW (SF) and Guaranteed_BW (SF) and outputs the minimum of those two inputs (i.e., BE_BW (SF)). In Step 2, Min block 206 receives Proactive_BW (SF) from the PBP 204 and Unused_BW and outputs the minimum of those two inputs. In Step 3, summation (Sum) Min block 208 receives (i) the output from Min block 202 that is the minimum of Requested_BW (SF) and Guaranteed_BW (SF) and (ii) the output from Min block 206 that is minimum of Proactive_BW (SF) from the PBP 204 and Unused_BW, and outputs the sum of those two inputs. Note that Step 1 is performed for all upstream B/W requests received by the CMTS 102 from modems 104 during a network operation cycle before Step 2 is performed for any service flow so that the PBP 204 can determine how much unallocated upstream B/W is available to be distributed to PGS service flows after the CMTS 102 determines the total amount of upstream B/W initially allocated to all of the requesting service flows in Step 1. In Step 4, Min block 210 receives the output of Sum block 208 and Max_Proactive_BW (SF) and outputs the sum of those two inputs. In Step 5, Min block 212 receives the output from Min block 210 and Max_Allowed_BW (SF) and outputs the minimum of those two inputs as Allocated_BW (SF).

In some implementations, the various amounts of upstream B/W are characterized in terms of numbers of timeslots (aka mini-slots) in the TDD transmission of signals over the cable 106. In addition to allocating numbers of timeslots for the multiple service flows, the CMTS 102 also schedules the initial timeslot for each service flow to ensure that only one service flow transmits upstream signals at a time.

In some implementations, the upstream B/W requests transmitted by the modems 104 may be piggybacked on a data frame. In other implementations, the upstream B/W requests are contained in stand-alone frames.

The Guaranteed_BW (SF) value generated by the token-bucket algorithm and the Max_Allowed_BW (SF) value are selected to avoid congestion on the cable 106 while providing equitable distribution of upstream B/W among the different service flows. Those skilled in the art will understand that other suitable algorithms, such as (without limitation) leaky-bucket algorithms, can be employed by the CMTS instead of a token-bucket algorithm.

The function of the Proactive Bandwidth Predictor 204 is to provide an estimate of the bandwidth need on a service flow from a modem in the upcoming operation cycle. The estimation procedure can be based on activity patterns of the modem. One implementation of the PBP 204 is a linear predictor that estimates the bandwidth need as a weighted addition of the bandwidth requests received in the past operation cycles. The weighting factors are designed to be exponentially forgetting such that the more-recent requests are weighted more in the estimate and the earlier requests are weighted less, e.g., practically ignored.

By performing the scheduler processing 200 of FIG. 2, the CMTS 102 allocates upstream B/W to the requesting modems based on the following principles:

Service class (aka speed tier or service tier)—the maximum bandwidth allowed for a particular service flow, for example, 100 Mbps, 300 Mbps, or 1 Gbps service flows. The CMTS 102 achieves this by implementing the token-bucket algorithm to determine the value of Guaranteed_BW (SF) for each requesting service flow. That is, at the beginning of each operation cycle, the CMTS 102 gives a number of "tokens" to each service flow proportional to its service class where the amount of upstream B/W to be allocated to that service flow will not exceed the number of tokens currently held by that service flow's bucket. Note that, in some implementations, other parameters make the token-bucket algorithm more flexible. One example variation of the token bucket algorithm is to introduce a credit line parameter. The credit line allows the CMTS 102 to allocate more bandwidth to a service flow than the number of tokens currently held by the modem up to a specified credit limit. The credit will be paid in subsequent operation cycles in the way that the CMTS 102 allocates fewer tokens in future operation cycles. The credit line parameter accommodates a temporary burst of high data volume while maintaining the maximum sustaining data rate cap.

Priority—The CMTS 102 will first meet the needs of requesting service flows of higher priority.

Fairness—The CMTS 102 will allocate the amount of transmission opportunities to the requesting service flows in proportion to their requested upstream B/W but not necessarily meet the service flow's request as specified by the amount of upstream B/W in the request messages. The CMTS 102 may also maintain a minimum level of allocations to the service flows for guaranteed service.

The priority and fairness are reflected in the processing of FIG. 2 in the parameter Guaranteed_BW (SF). A priority (descending value) list of Guaranteed_BW (SF) for all service flows makes sure those service flows of higher priority will have their bandwidth requests fulfilled. At the same time, giving a non-zero Guaranteed_BW (SF) to service flows of lower priority makes sure that those service flows will not starve.

The scheduler processing 200 of FIG. 2 represents a type of best-effort service offered by the CMTS 102 because the transmission opportunity received by a service flow is determined by the overall load to the CMTS 102. Note that a service flow might not receive enough or any transmission opportunities in an operation cycle. Also, a service flow will wait for the next network operation cycle if its upstream B/W request misses the current operation cycle.

As described previously, in response to service quality and latency requirements of certain applications, the CMTS 102 may give transmission opportunities to a PGS service flow which did not send requests or give extra transmission opportunities than what are requested by a PGS service flow, if the CMTS 102 predicts that there may be a bandwidth requirement from that service flow in the next operation cycle. This proactive service can be available when the system has extra upstream bandwidth.

The scheduler processing 200 performed by the CMTS 102 to allocate upstream B/W to the service flows may have lower latency than a conventional BE technique due to the proactive allocation of bandwidth to PGS service flows, which may reduce the total number of upstream B/W requests transmitted by the modems 104. Furthermore, by allocating upstream B/W based on actual requested amounts of upstream BW before divvying up remaining available upstream B/W to PGS service flows, the scheduler processing 200 may result in less wasted upstream B/W and therefore more efficient allocation of upstream B/W.

Figure 3:
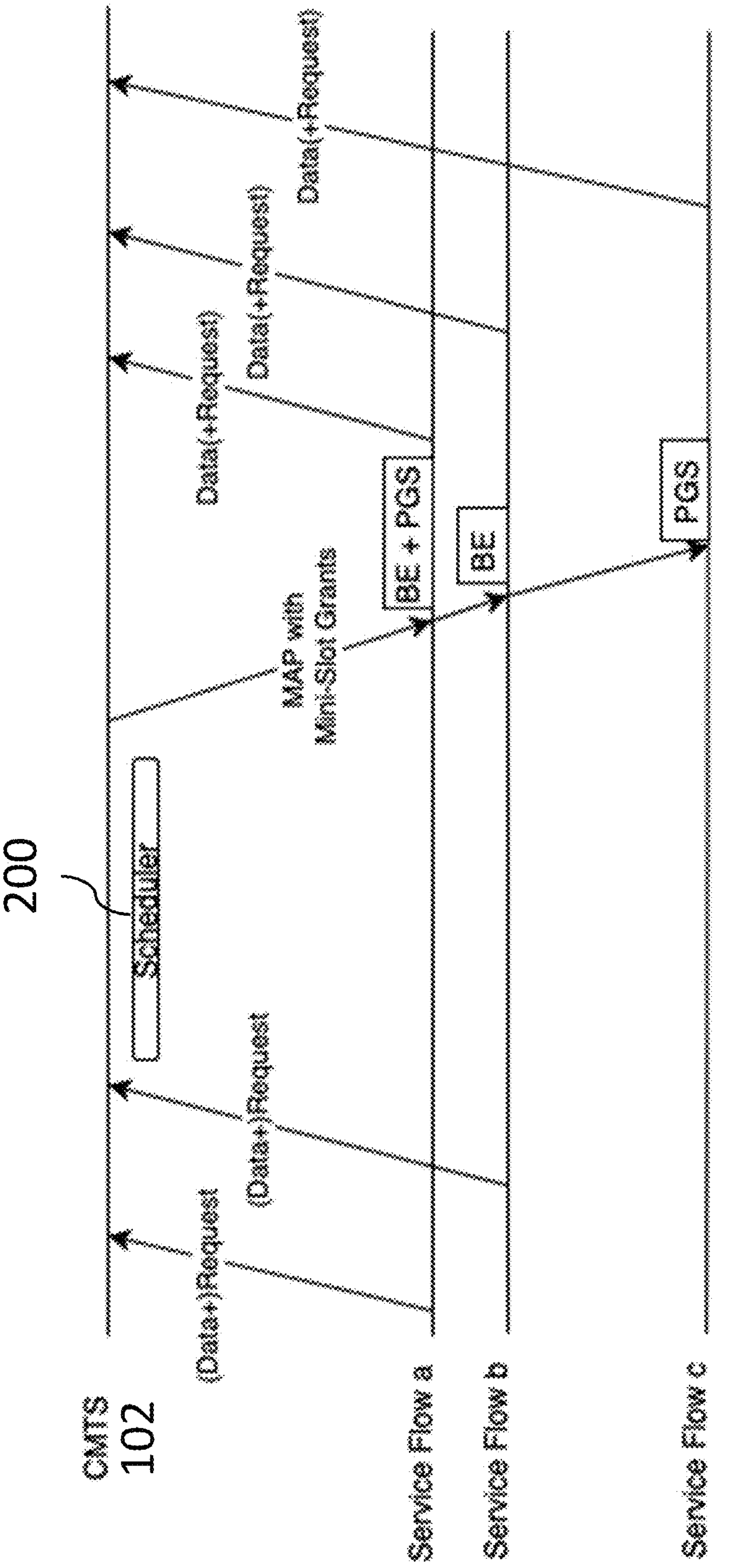
FIG. 3 is a representation of signal flow for one example scenario of the implementation of the scheduler processing of FIG. 2 in the network of FIG. 1.

FIG. 3 is a representation of signal flow 300 for one example scenario of the implementation of the scheduler processing 200 of FIG. 2 in the network 100 of FIG. 1 involving three service flows (a, b, and c) handled by one, two, or three different modems 104, depending on the particular situation, where Service Flows a and c are PGS service flows, and Service Flow b is a non-PGS service flow. As shown in FIG. 3, during a particular operation cycle of the network 100, the modem(s) for Service Flows a and b transmit, to the CMTS 102, upstream B/W requests specifically identifying amounts of requested upstream B/W for those service flows (i.e., Requested_BW (SF)). As indicated by "(Data+)" in FIG. 3, depending on the particular implementation, those upstream B/W requests may be piggybacked on a data frame or contained in stand-alone frames.

The CMTS 102 then performs the scheduler processing 200 of FIG. 2 to determine amounts of allocated upstream bandwidth (i.e., Allocated_BW (SF)) for Service Flows a, b, and c, where the allocated upstream B/W for PGS Service Flow a is based on the sum of the output BE of Min block 202 of FIG. 2) and PGS (i.e., Proactive_BW (SF)), the allocated upstream B/W for non-PGS Service Flow b is BE, and the allocated upstream B/W for PGS Service Flow c is PGS, where BE and PGS may be different for different service flows. Note that PGS Service Flow c receives an allocation of upstream B/W even though no upstream B/W request was transmitted for PGS Service Flow c during the current network operation cycle.

As shown in FIG. 3, the CMTS 102 then transmits grant responses to the corresponding modem(s) 104 identifying the timing and amount of allocated upstream B/W for the Service Flows a, b, and c, respectively. As shown in FIG. 3, at the beginning of the next operation cycle, the modem(s) 104 for all three Service Flows a, b, and c transmit upstream B/W requests to the CMTS 102.

Figure 4:
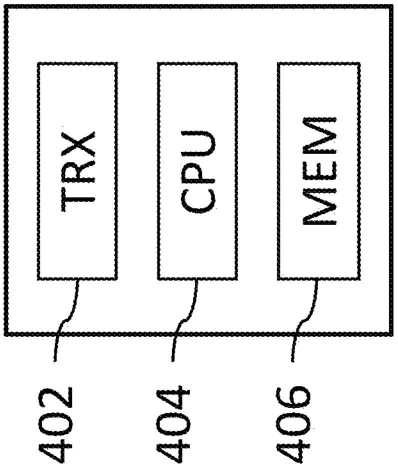
FIG. 4 is a simplified hardware block diagram of the CMTS of FIG. 1.

FIG. 4 is a simplified hardware block diagram of the CMTS 102 of FIG. 1. As shown in FIG. 4, the CMTS 102 includes (i) communication hardware (e.g., a transceiver (TRX)) 402 that supports communications with the modems 104, (ii) a processor (e.g., CPU microprocessor) 404 that controls the operations of the CMTS 102, and (iii) a memory (e.g., RAM, ROM) 406 that stores code executed by the processor 404 and/or data generated and/or received by the CMTS 102. Depending on whether cable 106 is a wireline cable or an optical cable, TRX 402 will correspondingly be a wireline transceiver or an optical transceiver. Note that the modems 104 of FIG. 1 may be implemented using analogous configurations of communication hardware, processors, and memories.

Although the disclosure has been described in the context of a CMTS of a DOCSIS network, those skilled in the art will understand that the disclosure can be implemented in the context of networks having integrated CMTS systems and distributed access architecture (DAA)-based CMTS systems such as virtual CMTS systems and remote physical (PHY) or medium access control (MAC) managers and remote MAC-PHYS.

In certain embodiments, the present disclosure is a method of allocating upstream bandwidth (B/W) to service flows in a cable modem network. The method comprises (a) receiving one or more requests from one or more modems, wherein each request identifies an amount of requested upstream B/W for a corresponding requesting service flow; (b) determining how much best-effort (BE) upstream B/W to allocate for each of the one or more requesting service flows; (c) determining how much remaining upstream B/W is available after taking into account all of the BE upstream B/W for the one or more requesting service flows; (d) determining how much of the remaining upstream B/W to allocate as proactive grant service (PGS) upstream B/W to one or more PGS service flows; (e) determining, for one or more service flows, a summed upstream B/W as a sum of any corresponding BE upstream B/W and any corresponding PGS upstream B/W; (f) determining, for the one or more service flows, an amount of allocated upstream B/W as a minimum of the summed upstream B/W and a maximum allowable upstream B/W; and (g) transmitting one or more grants to the one or more modems, wherein each grant identifies the amount of allocated upstream B/W for a corresponding service flow.

In at least some of the above embodiments, determining how much BE upstream B/W to allocate for each requesting service flow comprises determining a minimum of (i) the corresponding amount of requested upstream B/W and (ii) an amount of guaranteed upstream B/W.

In at least some of the above embodiments, the amount of guaranteed upstream B/W is determined by implementing a token-bucket algorithm.

In at least some of the above embodiments, determining how much of the remaining bandwidth to allocate as PGS upstream B/W to the one or more PGS service flows is based on activity patterns of the modems.

In at least some of the above embodiments, determining how much of the remaining bandwidth to allocate as PGS upstream B/W to the one or more PGS service flows is based on a weighted addition of bandwidth requests received in past operation cycles, wherein weighting factors are designed to be exponentially forgetting such that more-recent requests are weighted more and earlier requests are weighted less.

In at least some of the above embodiments, each amount of requested upstream B/W is a number of requested timeslots, and each amount of allocated upstream B/W is a number of allocated timeslots starting at a specified timeslot.

In at least some of the above embodiments, the method is performed by a Cable Modem Termination System (CMTS) of a Data Over Cable Service Interface Specification (DOCSIS) network.

In at least some of the above embodiments, the method is performed by an integrated CMTS system or a distributed access architecture (DAA)-based CMTS system such as a virtual CMTS system or a remote physical (PHY) or medium access control (MAC) manager or a remote MAC-PHY.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "CMTS" or "modem" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits. The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A method of allocating upstream bandwidth (B/W) to service flows in a cable modem network, the method comprising:

receiving one or more requests from one or more modems, wherein each request identifies an amount of requested upstream B/W for a corresponding requesting service flow;

determining how much best-effort (BE) upstream B/W to allocate for each of the one or more requesting service flows;

determining how much remaining upstream B/W is available after taking into account all of the BE upstream B/W for the one or more requesting service flows;

determining how much of the remaining upstream B/W to allocate as proactive grant service (PGS) upstream B/W to the one or more requesting service flows;

determining, for the one or more requesting service flows, a summed upstream B/W as a sum of any corresponding BE upstream B/W and any corresponding PGS upstream B/W;

determining, for the one or more requesting service flows, an amount of allocated upstream B/W as a minimum of the summed upstream B/W and a maximum allowable upstream B/W; and transmitting one or more grants to the one or more modems, wherein each grant identifies the amount of allocated upstream B/W for a corresponding requesting service flow.

2. The method of claim 1, wherein determining how much BE upstream B/W to allocate for each requesting service flow comprises determining a minimum of (i) the corresponding amount of requested upstream B/W and (ii) an amount of guaranteed upstream B/W.

3. The method of claim 2, wherein the amount of guaranteed upstream B/W is determined by implementing a token-bucket algorithm.

4. The method of claim 1, wherein determining how much of the remaining bandwidth to allocate as PGS upstream B/W to the one or more requesting service flows is based on activity patterns of the modems.

5. The method of claim 4, wherein determining how much of the remaining bandwidth to allocate as PGS upstream B/W to the one or more requesting service flows is based on a weighted addition of bandwidth requests received in past operation cycles, wherein weighting factors are designed to be exponentially forgetting such that more-recent requests are weighted more and earlier requests are weighted less.

6. The method of claim 1, wherein:

each amount of requested upstream B/W is a number of requested timeslots; and each amount of allocated upstream B/W is a number of allocated timeslots starting at a specified timeslot.

7. The method of claim 1, wherein the method is performed by a Cable Modem Termination System (CMTS) of a Data Over Cable Service Interface Specification (DOCSIS) network.

8. The method of claim 1, wherein the method is performed by an integrated CMTS system or a distributed access architecture (DAA)-based CMTS system such as a virtual CMTS system or a remote physical (PHY) or medium access control (MAC) manager or a remote MAC-PHY.

9. The method of claim 1, wherein one or more of the requesting service flows are PGS service flows.

10. The method of claim 1, wherein all of the requesting service flows are PGS service flows.

11. An apparatus comprising:

a memory; and at least one processor, coupled to the memory and operative to:

receive one or more requests from one or more modems, wherein each request identifies an amount of requested upstream bandwidth (B/W) for a corresponding requesting service flow;

determine how much best-effort (BE) upstream B/W to allocate for each of the one or more requesting service flows;

determine how much remaining upstream B/W is available after taking into account all of the BE upstream B/W for the one or more requesting service flows;

determine how much of the remaining upstream B/W to allocate as proactive grant service (PGS) upstream B/W to the one or more requesting service flows;

determine, for the one or more requesting service flows, a summed upstream B/W as a sum of any corresponding BE upstream B/W and any corresponding PGS upstream B/W;

determine, for the one or more requesting service flows, an amount of allocated upstream B/W as a minimum of the summed upstream B/W and a maximum allowable upstream B/W; and transmit one or more grants to the one or more modems, wherein each grant identifies the amount of allocated upstream B/W for a corresponding requesting service flow.

12. The apparatus of claim 11, wherein the processor is operative to determine how much BE upstream B/W to allocate for each requesting service flow by determining a minimum of (i) the corresponding amount of requested upstream B/W and (ii) an amount of guaranteed upstream B/W.

13. The apparatus of claim 12, wherein the processor is operative to determine the amount of guaranteed upstream B/W by implementing a token-bucket algorithm.

14. The apparatus of claim 11, wherein the processor is operative to determine how much of the remaining bandwidth to allocate as PGS upstream B/W to the one or more requesting service flows based on activity patterns of the modems.

15. The apparatus of claim 14, wherein the processor is operative to determine how much of the remaining bandwidth to allocate as PGS upstream B/W to the one or more requesting service flows based on a weighted addition of bandwidth requests received in past operation cycles, wherein weighting factors are designed to be exponentially forgetting such that more-recent requests are weighted more and earlier requests are weighted less.

16. The apparatus of claim 11, wherein:

each amount of requested upstream B/W is a number of requested timeslots; and each amount of allocated upstream B/W is a number of allocated timeslots starting at a specified timeslot.

17. The apparatus of claim 11, wherein the apparatus is a Cable Modem Termination System (CMTS) of a Data Over Cable Service Interface Specification (DOCSIS) network.

18. The apparatus of claim 11, wherein the apparatus is an integrated CMTS system or a distributed access architecture (DAA)-based CMTS system such as a virtual CMTS system or a remote physical (PHY) or medium access control (MAC) manager or a remote MAC-PHY.

19. The method of claim 11, wherein one or more of the requesting service flows are PGS service flows.

20. The method of claim 11, wherein all of the requesting service flows are PGS service flows.

* * * * *